INVENTORS
ITALO M. AMENTA
ROBERT J. SCHULTZ
BY McCormick, Paulding & Huber
ATTORNEYS

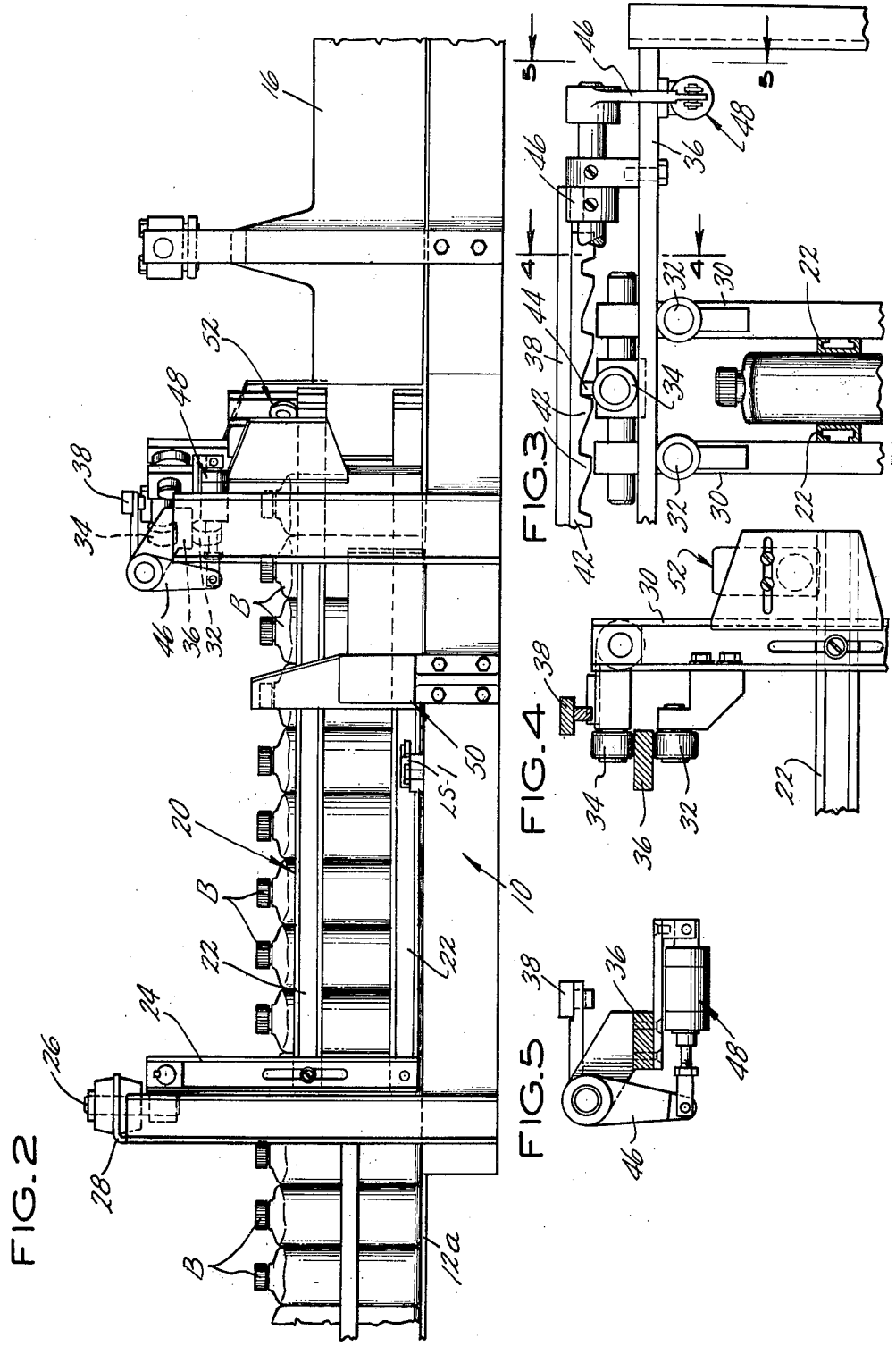

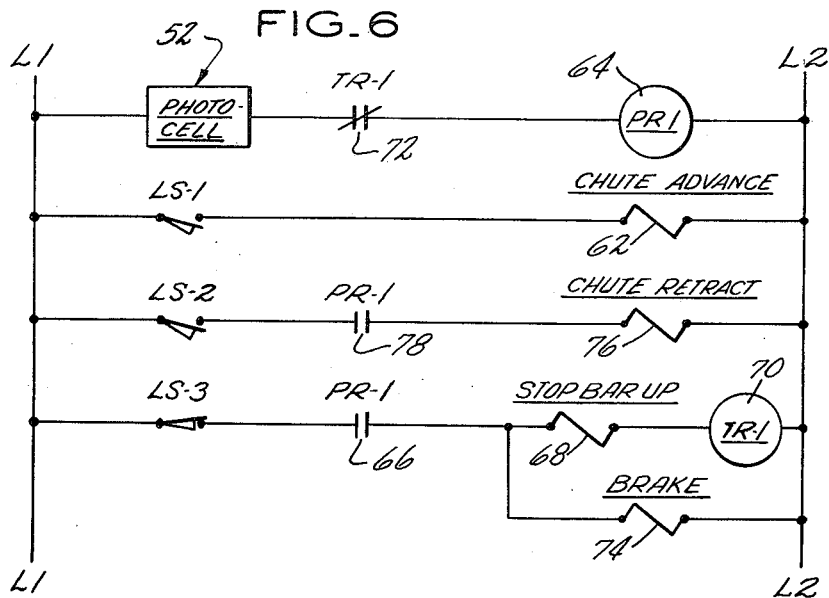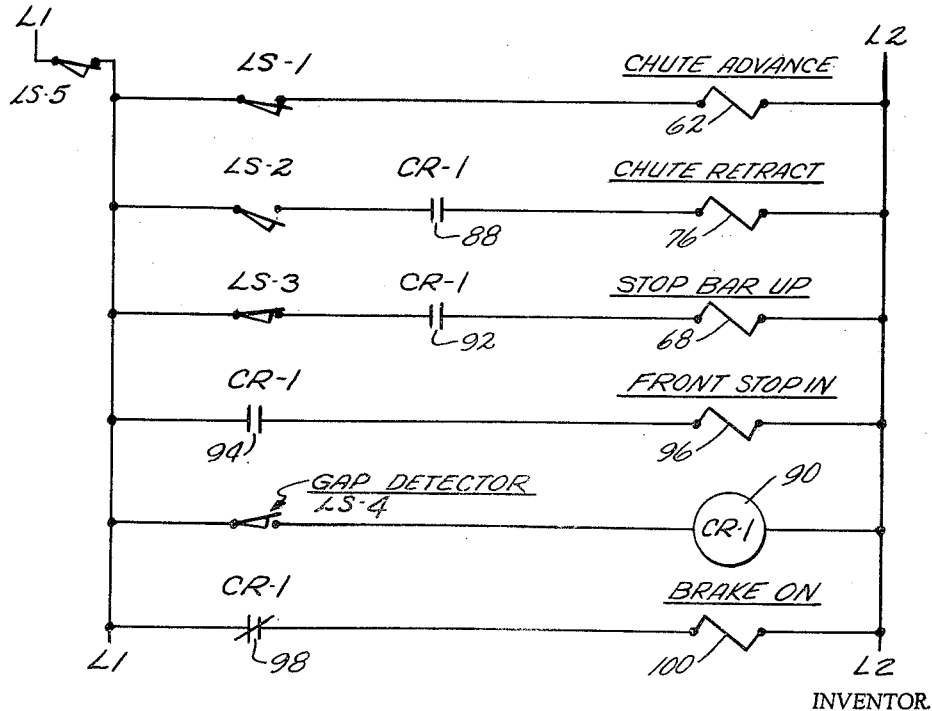

United States Patent Office 3,193,078
Patented July 6, 1965

---

3,193,078
ARTICLE DIVIDER FOR CONVEYORS
Italo M. Amenta, Middletown, and Robert J. Schultz, Portland, Conn., assignors to Emhart Corporation, Bloomfield, Conn., a corporation of Connecticut
Filed Jan. 18, 1963, Ser. No. 252,517
8 Claims. (Cl. 198—31)

This invention relates to a mechanism for directing articles being advanced on a conveyor in a single row into a plurality of side-by-side rows.

It is the general object of the invention to provide a mechanism of the aforementioned type which will operate automatically to direct a selected number of advancing articles from a single row into each of a plurality of side-by-side rows so that they can thus be grouped for easier handling in specific additional operations.

It is believed that the mechanism of this invention can be used to great advantage in association with case packing machinery wherein articles are to be cased or packed in a plurality of side-by-side rows comprising a case load or one tier of a case load. The articles which are to be thus packed in many installations have just been produced or had some operation performed on them at some machine which discharges them in sequence onto a conveyor to form an advancing single row.

As will be described more fully, the mechanism features a guide chute which is pivotally supported at one end adjacent the advancing single row to receive articles therefrom while the swinging end of the chute moves across the mouths of lane-defining means for the plurality of side-by-side rows. A stop bar extends across the conveyor to engage and position the swinging end of the chute in registry with each of the lanes. In one version of the mechanism, a photocell unit is carried by the swinging end of the chute to count the articles directed into each lane. This photocell unit actuates the stop bar so that the same number of articles will be directed into each side-by-side lane or row. Another version of the mechanism is used when the passing articles are of such nature that they cannot readily be distinguished or counted by the photocell means, and this version employs mechanically operated electrical switch means for detecting or counting the passing articles to actuate the stop bar.

The drawings show preferred embodiments of the invention and such embodiments will be described, but it will be understood that various changes may be made from the constructions disclosed, and that the drawings and description are not to be construed as defining or limiting the scope of the invention, the claims forming a part of this specification being relied upon for that purpose.

Of the drawings:

FIG. 2 is a side elevational view of the mechanism shown in FIG. 1;

FIG. 3 is an enlarged transverse sectional view taken as indicated by the line 3—3 of FIG. 1;

FIG. 4 is a detail sectional view taken as indicated by the line 4—4 of FIG. 3;

FIG. 5 is a further detail sectional view taken as indicated by the line 5—5 of FIG. 3;

FIG. 6 is a wiring diagram illustrating an exemplary control for the embodiment of the invention shown in FIGS. 1–5;

FIG. 11 is a wiring diagram illustrating an exemplary control for the form of the invention shown in FIGS. 7–10.

Figure 1:
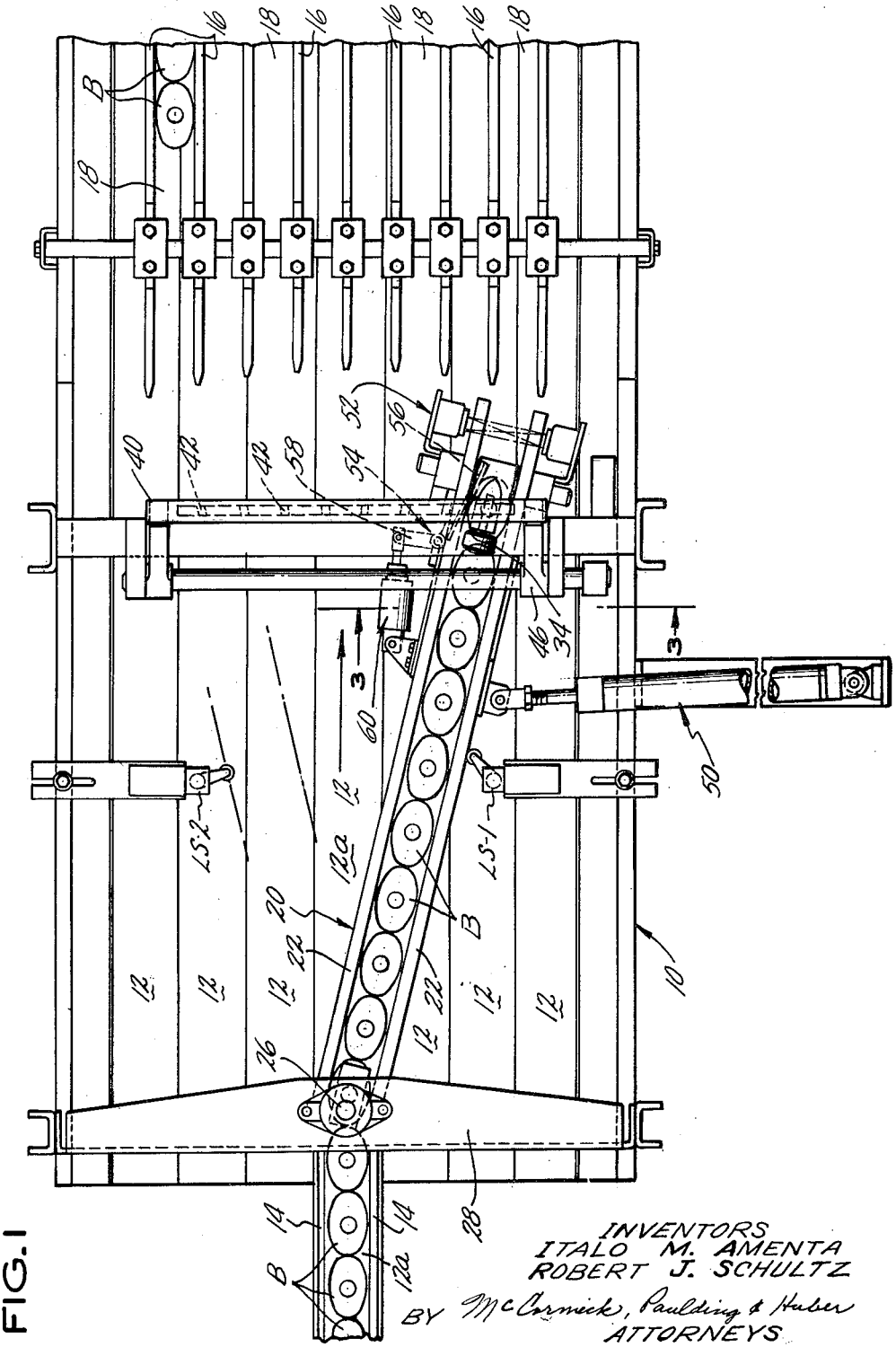
FIG. 1 is a top plan view of the photocell-counter version of the divider mechanism of this invention.

In each form of the invention, the mechanism includes a frame indicated generally at 10 supporting a continuously operating driven conveyor preferably in the form of a plurality of side-by-side endless belts or chains 12, 12. At least one of the central longitudinaly extending conveyor sections, designated 12a, is of sufficient extent to accommodate a single row of advancing articles B, B which, in accordance with the invention, are to be directed into a plurality of rows as they move in the direction of the arrow (FIG. 1) on the conveyor.

The conveyor frame mechanism includes a pair of longitudinally extending rails 14, 14 which are suitably supported over the conveyor to define a single lane for the advancing single row of articles, this single lane terminating at an upstream position on the conveyor. A plurality of longitudinally extending rails 16, 16 are suitably supported by the conveyor frame over the conveyor and in transversely spaced relationship to each other across the conveyor to define a plurality of lanes 18, 18 to receive the articles in a downstream position on the conveyor in a plurality of side-by-side rows.

For purposes of illustration, the articles B, B have been shown to comprise a plurality of bottles which, due to their configuration, can be scanned and counted by electric eye or photocell means. That is, a photocell unit can be set up to count the passing bottles by light interruption between their necks, although the bottles are advanced in abutting relationship. When handling articles such as bottles, they are to be disposed in the lanes 18, 18 or in side-by-side rows with an equal number of bottles in each row so that the plurality of rows can be introduced to a case packing machine to comprise a case load or one tier of a case load.

So much of the mechanism as has been described is common to both illustrated versions of it, and another common feature is the provision of a guide chute indicated generally at 20 and which extends generally longitudinally of the conveyor but which is pivotally supported at its upstream end adjacent the single lane to receive the advancing articles therefrom, and its swinging end moves adjacent the mouths of the plurality of lanes 18, 18. More specifically, the chute 20 comprises two pairs of parallel vertically adjustable rails 22, 22, there being one such pair on each side of the chute. The upstream ends of the rails are attached to vertical support structure 24 which is connected to a pivot shaft 26 depending from an overhead or support structure 28 forming a part of the conveyor frame. The downstream ends of the chute rails 22, 22 are connected to vertical support members 30, 30 and these vertical support members carry a pair of lower rollers 32, 32 and a single upper roller 34 which respectively engage the bottom and top surfaces of a transversely extending cross bar 36 which is supported by the frame over the conveyor. Thus, the downstream end of the chute 20 can swing laterally across the conveyor by movement of the rollers 32, 32 and 34 on the cross bar 36.

In accordance with the invention, a stop bar 38 is supported transversely of the conveyor above the chute swinging end support bar 36 and this stop bar is designed to arrest swinging movement of the downstream end of the chute in positions wherein it will register with the mouths of the respective lanes 18, 18. More specifically, the stop bar 38 is pivotally supported at one end and it has a plurality of depending toothlike appendages 42, 42 which are selectively engageable with a lug 44 carried by the swinging end of the chute adjacent its top support roller 34. When a tooth 42 engages the lug 44 in the downwardly pivoted position of the stop bar 38, the chute will be stopped at a position in registry with an associated lane 18. The stop bar 38 is pivoted upwardly by a bell crank 46 which engages the stop bar 38 at the end opposite its pivoted support. The bell crank 46 is operated to pivot the stop bar 38 by means of a fluid motor which may comprise an air cylinder and piston unit indicated generally at 48 and which is supported by the cross bar or rail 36. It will be seen by the generally saw-tooth configuration of the appendages 42, 42 on the stop bar 38 that when the stop bar is elevated while the chute is biased from right to left in FIG. 3 or from bottom to top in FIG. 1 and the stop bar is then permitted to drop, the chute will move from adjacent one lane into a position in registry with the next adjacent lane 18.

The swinging movement of the downstream end of the chute 20 from right to left in FIG. 3 or from bottom to top in FIG. 1 will be referred to as advance movement thereof, and movement of the chute in the opposite direction will be referred to as retracting movement thereof. Movement of the chute in both versions of the invention is effected by a fluid motor comprising a reversible air cylinder and piston unit indicated generally by the reference numeral 50 (FIG. 1). The limits of reversible movement of the chute are defined by a pair of limit switches forming a part of the control system to be described hereinafter. However, in FIG. 1 it will be noted that one limit switch LS-1 is adjustably supported at one side of the conveyor to limit the retracting movement of the chute and another limit switch LS-2 is supported on the other side of the conveyor to limit the advancing movement of the chute. The support for the limit switches LS-1 and LS-2 in each case is adjustable so that at the extreme positions of the chute it will be located in registry with the outer lanes 18, 18 on the conveyor.

In the form of the invention shown in FIGS. 1-5, a photocell unit indicated generally at 52 is utilized as part of a counting mechanism for counting the articles passing from the chute 20 into a lane 18. More specifically, the photocell unit comprises a lamp and a light sensitive device both of which are supported on the swinging end of the chute so that the light will be beamed across the chute and can be interrupted by passage of the bottles therethrough. A conventional photocell unit 52 will be pulsed and these pulses can be transmitted to a pulsing relay forming a part of the counter mechanism, this counter mechanism being of conventional form that will permit preselection of a selected number of pulses, corresponding to a selected number of bottles passing the photocell unit, before the relay is energized to perform a control function. One control function of the counter mechanism is to actuate a brake structure indicated generally by the number 54 in FIG. 1. This brake structure includes an arm 56 engageable with a bottle in the chute near the swinging end thereof to stop further movement of bottles in the chute. The arm 56 is swung into and out of bottle engaging position by a bell crank 58 operable by a fluid motor which may comprise an air cylinder and piston unit 60. This function and the other control functions of the mechanism will be more readily understood in the following description of operation with reference to FIG. 6 as well as to FIGS. 1-5.

In considering the operation of the device, it is to be assumed that the lanes 18, 18 are to be filled in sequence with the same number of bottles in each lane starting with the right-hand lane when viewed in the direction of movement and proceeding lane by lane to the left-hand lane. It can be assumed further that the chute is initially positioned so that its swinging end is adjacent the mouth of the right-hand lane, and it can be assumed that the conventional counter structure has been preset to operate after a selected number of bottles have been moved from the chute past the photocell unit 52 into each lane.

Under such conditions, the normally open limit switch LS-1 will be held closed to energize a solenoid 62 in a circuit between two electrical power lines L-1 and L-2 (FIG. 6). The solenoid 62 when energized will operate a conventional valve (not shown) to introduce air under pressure to the fluid motor 50 so as to exert air pressure thereby tending to advance the chute 20. The aforementioned valve should be of a type which will remain in any position wherein it is located until it is repositioned by further solenoid actuated movement thereof. Thus, the advancing bias will remain on the chute after it has been moved from the initial position and the limit switch LS-1 resumes its normal open position. However, initially, the chute is held in the position shown in FIG. 1 by the stop bar 38.

In this position, the conveyor will move bottles from the chute into the right-hand lane 18, the bottles being counted as they pass from the chute by the photocell unit 52. When the selected number of bottles have passed into the farthest right-hand lane, the photocell unit 52 will energize a pulsed relay 64 forming a part of the counter mechanism, the said relay being included in a power circuit with the photocell unit 52 as shown in FIG. 6. When the relay 64 is energized, its contacts 66 are closed in a circuit which includes a normally closed limit switch LS-3, a solenoid 68, and a timer relay 70. The solenoid 68 when energized operates a suitable valve (not shown) which normally vents air but which will be positioned by energization of the solenoid 68 to direct air under pressure to the fluid motor 48 which is then operated to pivot the stop bar 38 upwardly. When the stop bar 38 moves upwardly a sufficient distance to permit swinging movement of the chute 20, it will engage and open the limit switch LS-3 thereby de-energizing the solenoid 68 which permits the control valve to vent air from the fluid motor 48 and thus the stop bar drops to its normal down position. Energization of the timer relay 70 in the same circuit with the stop bar solenoid 68 causes it to open its normally closed contacts 72 in the counter circuit to de-energize the counter relay 64. When this is done, the counter is reset to begin a new bottle counting operation. As the stop bar is pivoted upwardly momentarily, the bias on the chute swings it beneath the stop bar toward the next adjacent lane 18, and the dropping stop bar will arrest movement of the chute in a position of registry with the said adjacent lane.

It will be observed that a solenoid 74 is connected in parallel with the stop bar solenoid 68 and the timer relay 70. The solenoid 74 is used to actuate a conventional valve (not shown) that normally vents air but which will be positioned by actuation of the solenoid 74 to direct air under pressure to the brake air cylinder 60. Thus, the brake arm 56 is actuated to engage the bottles or other articles in the chute to arrest movement thereof while the chute is swung from one lane to another. The brake solenoid 74 is de-energized when the limit switch LS-3 is opened by the elevated stop bar and the brake is swung out of position to permit the advance of bottles into the lane now registering with the chute.

The same cycle of operation thus far described is repeated at each of the lanes 18, 18 as the chute 20 is swung across the conveyor. When the chute reaches the farthest lefthand lane 18 it engages and closes the normally open limit switch LS-2 which is connected in circuit with a chute retracting solenoid 76, but this circuit can be closed to energize the solenoid only when the pulsed relay 64 has been energized to close its normally open contacts 78. Thus, after the chute has reached its farthest left-hand position and after the bottles have been advanced therefrom into the farthest left-hand lane, the solenoid 76 will operate on the valve controlling the fluid motor 50 so as to retract the chute to the first position described adjacent the right-hand lane 18.

The embodiment of the invention illustrated in FIGS. 7-11 is the same as the first described embodiment except for the counter mechanism. This embodiment or alternative form is particularly adapted for handling articles such as square packages or cartons P, P which are being advanced in abutting relationship and the passage of which cannot easily be distinguished by electric eye means.

In this form of the invention, a normally open limit switch LS–5 is positioned adjacent the upstream single lane to be held closed by articles passing through that lane into the chute 20. As shown in FIG. 11, the limit switch LS–5 is included in one of the power lines L–1 so as to stop all operation of the mechanism in the event no articles are passing into the chute for division into the plurality of lanes 18, 18. The counting mechanism in this version of the invention includes a limit switch LS–4 which is normally closed but held open by the articles P, P moving through the swinging or downstream end of the chute 20. This limit switch LS–4 may be referred to as a gap detector and it will close if a space occurs between adjacent articles P, P. In the event this occurs, a stop member 80 is projected into the chute to arrest movement of the articles P, P at the swinging end or downstream extremity of the chute. The stop is operated to be moved into the chute or out of the chute by a fluid motor 82.

A brake 84 is also incorporated in the alternative form of construction, this brake having an arm that will engage articles in the chute to arrest movement thereof at a position spaced from the swinging end of the chute. The brake arm 84 is operated by a fluid motor 86, and this brake arm and fluid motor can be moved to adjusted positions along the chute to stop movement of articles within the chute except for a preselected number of articles between the brake arm 84 and the downstream end of the chute.

The operation of the alternative form of construction can be understood with reference to FIG. 11 wherein it will be observed that the limit switch LS–1 and chute advance solenoid 62 of the first version are incorporated. In addition, the alternative form includes the limit switch LS–2 and the chute retract solenoid 76, the limit switch LS–3 and the stop bar solenoid 68 of the first form.

Figure 7:
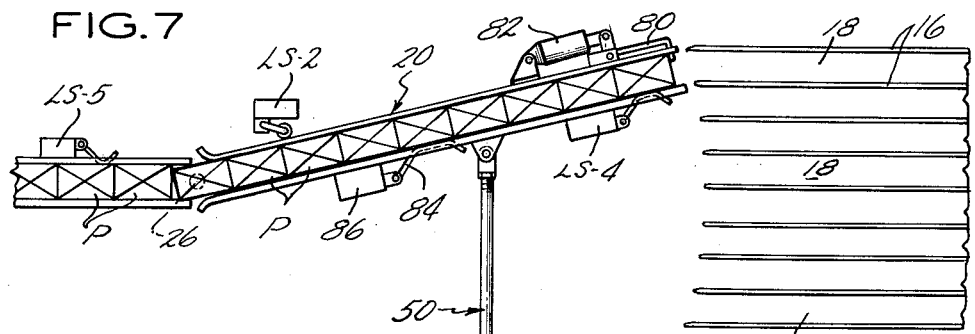
FIGS. 7–10 are schematic plan views of an alternative form of the invention, this form being the second version mentioned above.
Figure 8:
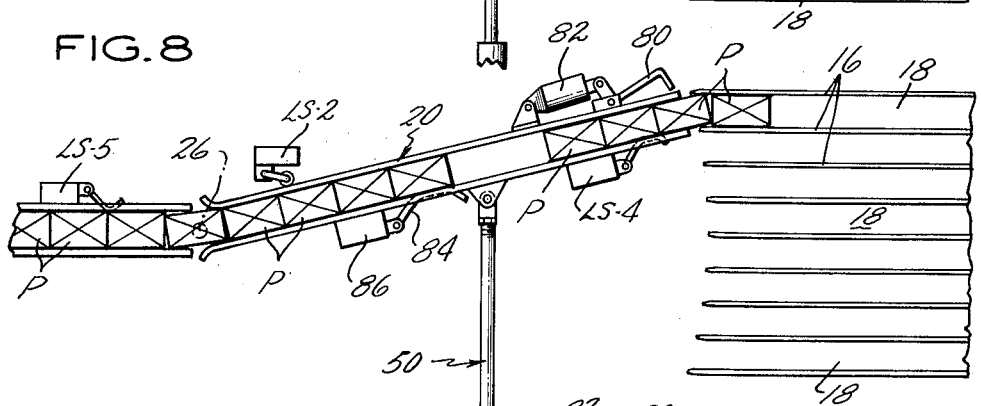
Figure 9:
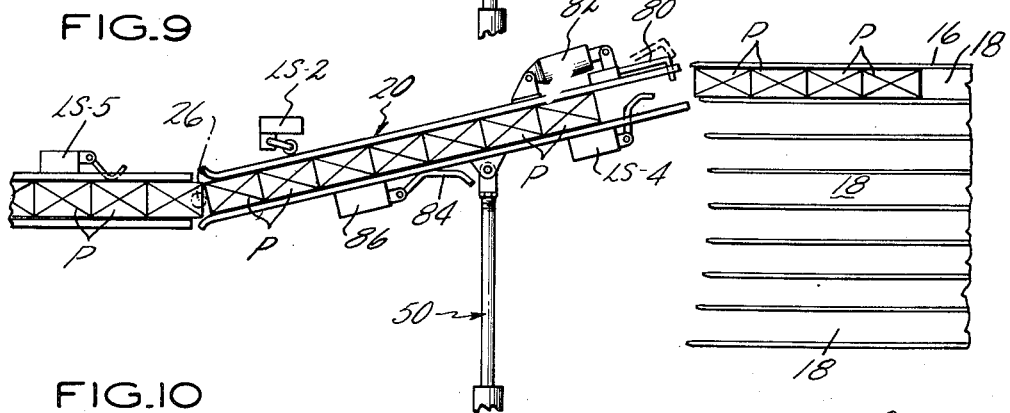

Assuming that the conditions are as shown in FIG. 7, it will be seen that the limit switch LS–2 is closed but the chute retract solenoid 76 cannot be energized until contacts 88 in circuit therewith have been closed. These contacts will be closed only when the selected number of articles P, P have moved from the chute into the left-hand lane 18 and the gap detector limit switch LS–4 has been permitted to close after the passage thereof. The closing of the limit switch LS–4 will energize a control relay 90 which thereupon closes its contacts 88 to energize the chute retract solenoid 76. At the same time, the control relay 90 closes its contacts 92 in the circuit with the stop bar solenoid 68 so that that solenoid will be energized to elevate the stop bar. Also, the control relay 90 closes its contacts 94 in circuit with a solenoid 96 that is thereby energized to thrust the article stop 80 into the chute 20 at the downstream end thereof. In addition, the control relay 90 will open its normally closed contacts 98 whereby a normally energized solenoid 100 is deenergized. The solenoid 100 when energized operates the fluid motor 86 to engage the brake 84 with the packages in the chute. When the solenoid is de-energized, the brake is disengaged and a new series of packages is permitted to move toward the swinging end of the chute. The stop 80 will arrest such movement of the packages at the swinging end of the chute. When the packages reach the stop 80, the gap detector limit switch LS–4 will be held open and the relay CR–1 will be de-energized so that the stop 80 will be removed from the path of the packages which will then be permitted to advance from the chute. In the meantime, the chute will have been retracted to the position shown in FIG. 10 so that the packages will then flow into the right-hand lane 18.

Figure 10:
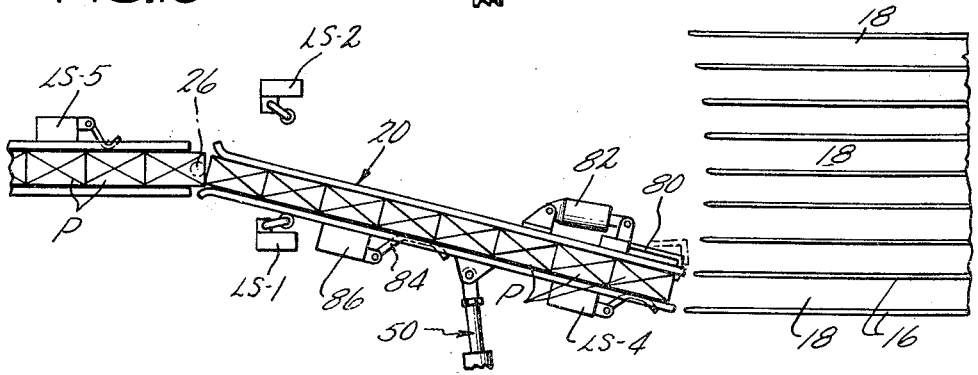

When the chute is positioned as shown in FIG. 10, the limit switch LS–1 is closed to permit an advancing bias on the chute and the limit switch LS–2 will, of course, be opened.

The same sequence of operations is repeated from lane to lane as the chute traverses the various lanes from right to left.

The invention claimed is:

1. A mechanism for directing advancing articles from a single row into a plurality of rows and comprising a longitudinally extending conveyor for the articles, means supported over the conveyor to confine movement of the articles to a single row at an upstream position on the conveyor and to define a plurality of side-by-side lanes for movement of the articles at a downstream position on the conveyor, a guide chute extending between said upstream and downstream positions and pivotally supported at its upstream end to receive the advancing row of articles, means supporting the downstream end of the chute for swinging movement thereof across the conveyor and adjacent said lanes, a stop bar movably supported generally transversely of and over said conveyor to engage and stop said chute in positions of registry with the respective lanes, means for pivoting said chute, and means for moving said stop bar at least momentarily out of engagement with said chute to permit movement thereof from one lane to another.

2. A mechanism for directing advancing articles from a single row into a plurality of rows and comprising a longitudinally extending conveyor for the articles, means supported over the conveyor to confine movement of the articles to a single row at an upstream position on the conveyor and to define a plurality of side-by-side lanes for movement of the articles at a downstream position on the conveyor, a guide chute extending between said upstream and downstream positions and pivotally supported at its upstream end to receive the advancing row of articles, means supporting the downstream end of the chute for swinging movement thereof across the conveyor and adjacent said lanes, a stop bar movably supported generally transversely of and over said conveyor to engage and stop said chute in positions of registry with the respective lanes, means for pivoting said chute, and means operable in response to movement of a selected number of articles from said chute into a lane to move said stop bar at least momentarily out of engagement with said chute to permit movement thereof to another lane.

3. A mechanism for directing advancing articles from a single row into a plurality of rows and comprising a longitudinally extending conveyor for the articles, means supported over the conveyor to confine movement of the articles to a single row at an upstream position on the conveyor and to define a plurality of side-by-side lanes for movement of the articles at a downstream position on the conveyor, a guide chute extending between said upstream and downstream positions and pivotally supported at its upstream end to receive the advancing row of articles, means supporting the downstream end of the chute for swinging movement thereof across the conveyor and adjacent said lanes, a stop bar disposed transversely over said conveyor and pivotally supported at one end and having a series of toothlike appendages each of which is adapted to engage and stop said chute in a position of registry with a respective lane, means for pivoting said chute, and means for pivoting said stop bar at least momentarily out of engagement with said chute to permit movement thereof from one lane to another.

4. A mechanism for directing advancing articles from a single row into a plurality of rows as defined in claim 3 wherein the means for pivoting said stop bar is operable in response to movement of a selected number of articles from said chute into a lane.

5. A mechanism for directing advancing articles from a single row into a plurality of rows and comprising a longitudinally extending conveyor for the articles, means supported over the conveyor to confine movement of the articles to a single row at an upstream position on the conveyor and to define a plurality of side-by-side lanes for movement of the articles at a downstream position on the conveyor, a guide chute extending between said upstream and downstream positions and pivotally supported at its upstream end to receive the advancing row of articles, means supporting the downstream end of the chute for swinging movement thereof across the conveyor and adjacent said lanes, a stop bar movably supported generally transversely of and over said conveyor to engage and stop said chute in positions of registry with the respective lanes, reversible means for pivoting said chute but normally biasing the same in one direction, and means for moving said stop bar at least momentarily out of engagement with said chute to permit movement thereof from one lane to another.

6. A mechanism for directing advancing articles from a single row into a plurality of rows as set forth in claim 5 wherein the means supporting the downstream end of the chute for swinging movement across the conveyor and adjacent said lanes comprises a cross bar disposed transversely of the conveyor and at least one roller riding on said cross bar and rotatably supported by said chute, said roller carrying a lug engageable by said stop bar, and said stop bar having a series of tooth-like appendages selectively engageable with said lug to stop said chute in selected positions of registry with the lanes.

7. A mechanism for directing advancing articles from a single row into a plurality of rows and comprising a longitudinally extending conveyor for the articles, means defining a single lane for the articles at an upstream position and a plurality of lanes at a downstream position on the conveyor, a guide chute pivotally supported at said upstream position and swinging across said downstream position to direct articles from said single lane into said plurality of lanes, photocell means associated with said chute to count the articles passing from said chute, a stop bar movably supported generally transversely of and over said conveyor to engage and stop said chute in positions of registry with the respective lanes and operable responsive to said photocell means to permit movement of said chute from a position in registry with one of said plurality of lanes to a position in registry with another thereof, and means operable responsive to said photocell means to arrest movement of articles in said chute during movement thereof.

8. A mechanism for directing advancing articles from a single row into a plurality of rows and comprising a longitudinally extending conveyor for the articles, means defining a single lane for the articles at an upstream position and a plurality of lanes at a downstream position on the conveyor, a guide chute pivotally supported at said upstream position and swinging across said downstream position to direct articles from said single lane into said plurality of lanes, means for permitting only a selected number of articles to pass from said chute, switch means operable upon passage of said selected number of articles from the chute, a stop bar movably supported generally transversely of and over said conveyor to engage and stop said chute in positions of registry with the respective lanes and operable in response to said switch means to permit movement of said chute from a position in registry with one of said plurality of lanes to a position in registry with another thereof.

References Cited by the Examiner

UNITED STATES PATENTS

| | | | |
|---|---|---|---|
| 2,713,446 | 7/55 | Vaughan | 198—40 |
| 2,987,251 | 6/61 | Alexander | 198—40 |
| 3,008,564 | 11/61 | Lakso | 198—40 |

SAMUEL F. COLEMAN, *Primary Examiner.*